(12) United States Patent
Davidson

(10) Patent No.: US 7,093,790 B1
(45) Date of Patent: Aug. 22, 2006

(54) MOORING FACILITY FOR TETHERED GAS BALLOON

(76) Inventor: John Scott Davidson, 335 Roosevelt Avenue, Ottawa, Ontario (CA) K2A 1Y9

( * ) Notice: Subject to any disclaimer, the term of this patent is extended or adjusted under 35 U.S.C. 154(b) by 0 days.

(21) Appl. No.: 09/959,295

(22) PCT Filed: Apr. 11, 2000

(86) PCT No.: PCT/CA00/00402

§ 371 (c)(1),
(2), (4) Date: Mar. 17, 2004

(87) PCT Pub. No.: WO00/63074

PCT Pub. Date: Oct. 26, 2000

(30) Foreign Application Priority Data

Apr. 16, 1999 (CA) .................................... 2269149

(51) Int. Cl.
*B64B 1/66* (2006.01)
(52) U.S. Cl. .................. 244/33; 244/115; 244/110 E
(58) Field of Classification Search ................ 244/31, 244/33, 99, 114 R, 110 E, 115
See application file for complete search history.

(56) References Cited

U.S. PATENT DOCUMENTS

| 1,812,955 A | * | 7/1931 | Horni ........................ 258/1.2 |
| 1,823,289 A | | 9/1931 | Powelson et al. |
| 3,933,326 A | | 1/1976 | Schauffler |
| 5,449,130 A | | 9/1995 | Huntington |
| 5,775,640 A | | 7/1998 | Gobbi et al. |

FOREIGN PATENT DOCUMENTS

| DE | 241 797 | | 6/1909 |
| DE | 241797 | * | 12/1911 |
| EP | 0 781 703 | | 7/1997 |
| FR | 317 367 | | 2/1904 |
| FR | 317367 | * | 2/1904 |
| JP | 63-235198 | | 9/1988 |

* cited by examiner

*Primary Examiner*—Peter M. Poon
*Assistant Examiner*—Timothy D. Collins
(74) *Attorney, Agent, or Firm*—Thorp Reed & Armstrong, LLP

(57) ABSTRACT

A mooring facility for a tethered gas balloon comprises a building structure containing a hemispherical basin capable of receiving the lower portion of an inflated lighter-than-air gas balloon for mooring the balloon. The surface of the bowl structure is complementary to the surface contour of the lower portion of the balloon. A gondola is suspended beneath the balloon and occupies a central recess in the bowl structure when the balloon is moored. The balloon is tethered by a cable and can be raised and lowered between an elevated operating position and a lowered moored position. The facility avoids the need for a large space requirement and can be erected or installed in a built-up area in or adjacent to a town or city.

11 Claims, 3 Drawing Sheets

MOORING FACILITY FOR TETHERED GAS BALLOON

This invention relates to a mooring facility for a tethered gas balloon.

Modern tethered gas balloons, normally helium filled, are capable of lifting significant numbers of fare-paying passengers, e.g. from 10 to 50, through vertical distances of 100 to 1000 feet primarily for sightseeing purposes. Repeated liftings represent a significant revenue-generating capability. Such balloons are expensive to manufacture and require careful operation and mooring to avoid damage due to weather conditions, vandalism, and unwanted or uncontrolled movement, while ensuring and maintaining safety of passengers and operating personnel.

In particular, since lighter-than-air gas-filled balloons remain permanently inflated, it is important to be able to moor the balloons overnight and during more extended non-operating periods, including periods of inclement weather conditions, in a safe and secure manner. In the past, many tethered gas balloons have been extensively damaged due to weather conditions while moored.

U.S. Pat. No. 5,775,640 (Gobbi et al) describes a landing installation for landing a tethered balloon having an annular gondola. The landing installation comprises a generally rectangular cavity in the ground, a landing platform covering the cavity and generally flush with the ground surface and provided with an opening through which the tethering cable passes. The landing platform is provided with an annular landing zone, while the gondola is fitted with swivel-mounted wheels fixed beneath the gondola in an annular zone the same size as the landing zone. This arrangement facilitates centering of the gondola when the balloon lands.

Neither of these prior systems affords a means of protecting and stabilizing the moored balloon/gondola combination from adverse weather conditions.

It is an object of the present invention to provide a system which avoids the drawbacks and shortcomings of the prior art and facilitates the mooring of a tethered gas balloon in a secure and safe manner under adverse weather conditions.

Another object of the invention is to provide a facility for safely mooring a tethered gas balloon while acting as a convenient and attractive launching station for balloon operation.

Accordingly, the invention provides a mooring facility for a tethered gas balloon, comprising:

(a) a building structure containing a hemispherical basin capable of receiving a lower portion of a tethered gas balloon, the surface of said hemispherical basin approximating the surface contour of the lower portion of said balloon;

(b) a recessed portion centrally of said hemispherical basin for accommodating a gondola suspended beneath said gas balloon; and (c) mooring means for securing the gas balloon in a moored position in said hemispherical basin with said gondola disposed in said recessed portion.

The balloon is generally spherical in configuration and the said hemispherical basin, referred to herein as a nest basin, is normally hemispherical so that, in the moored position, the lower balloon surface is substantially parallel to and slightly spaced from the surface of the nest basin. The spacing between the balloon and basin surfaces may be maintained by the presence of inflated tubes or the like, in contact with the basin surface, for instance a plurality of annular inflated tubes disposed horizontally in spaced relation around the interior basin surface.

In the moored position, the top of the nest basin is advantageously approximately level with the equator of the balloon. A seal is effected between the upper lip of the nest basin and the adjacent balloon surface, for instance by means of an annular inflated tube, so as to prevent wind gusts from inducing air pressure surges in the space between the moored balloon and the nest basin, which can give rise to instability of the balloon and potentially lead to damage or even destruction thereof.

The infrastructure surrounding and supporting the nest basin is comprised of a building with optional rooms, hallways, etc., for commercial or retail outlets, such as stores, kiosks, offices or restaurants, which may enhance the commercial viability of the tethered balloon as a tourist attraction. In this case, the top of the structure surrounding the nest basin may constitute a roof.

Furthermore, the fact that the tethered balloon occupies a fixed location is moored by being secured in a compact nest, as opposed to mooring lines extending far out from a balloon in the open air, means that relatively little space is required for operation and enables the facility to be positioned in or close to a built-up area, such as within or adjacent a town or city. This is in marked contrast to the usual space required to operate tethered balloons.

If desired, the mooring facility can be disposed on the top of an existing building, even a high rise building, to provide gondola based balloon flights high above a town or city, with the attendant panoramic views.

Alternatively, the facility can be built underground, with the roof of the facility being substantially flush with a ground surface.

The gondola suspended below the balloon is accommodated in the central recessed portion, referred to herein as a nest hole. The gondola rests on the floor of the nest hole, which may advantageously be raised and lowered, as required, to afford in a raised position a launching platform. A door and stairway can be provided between an interior room or passageway in a building structure surrounding the mooring facility to permit access of balloon operating personnel and passengers to the gondola.

In general, the mooring facility of the invention avoids the shortcomings and drawbacks of the prior art and permits safe and stable mooring of a large tethered gas balloon, even in windy conditions or other inclement weather.

Moreover, such a facility avoids the need for a large space requirement, and can be erected or installed in a relatively restricted area, such as a built-up area inside of or adjacent to a town or city.

Embodiments of the invention will now be described, by way of example, with reference to the accompanying drawings, in which.

Figure 1:
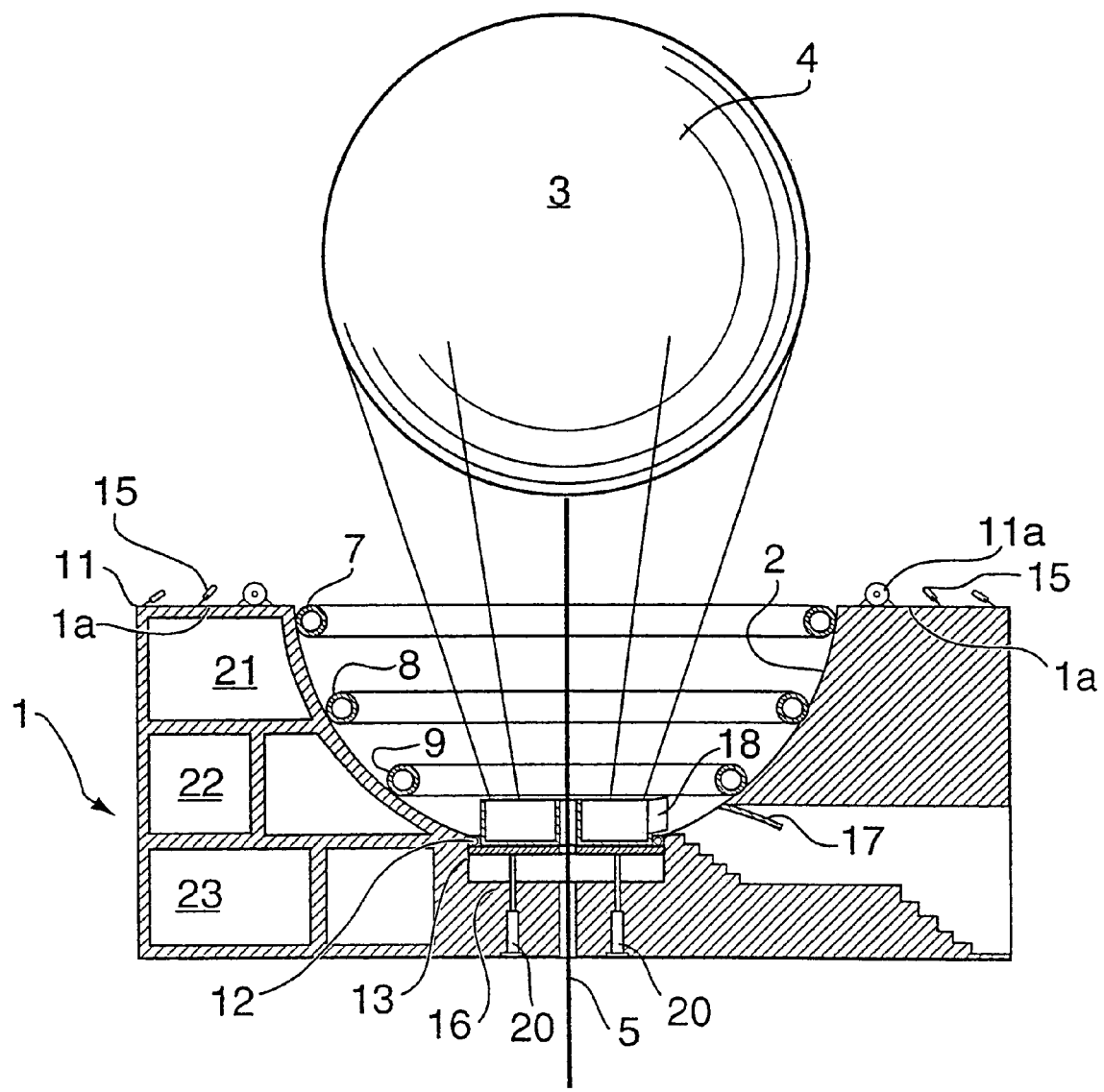
FIG. 1 is a side elevation, partly in cross-section, of a mooring facility for a tethered gas balloon.

Referring now to the drawings, the mooring facility comprises a nest structure 1 with a concave nest basin 2 formed centrally in the upper surface thereof. The dimensions and contours of the nest basin 2 are complementary to those of a gas balloon 3 having a balloon envelope 4. The gas balloon 3 is tethered above the nest basin 2 by cable 5 and can be raised and lowered by means of a winch (not shown) between an elevated operating or flight position (see FIG. 1) and a moored position (show in FIG. 2). When inflated, the balloon envelope is substantially spherical and has volume generally in the range of 100,000 to 300,000 cubic feet, and a diameter of 20 to 30 meters, e.g. 22 meters.

Figure 2:
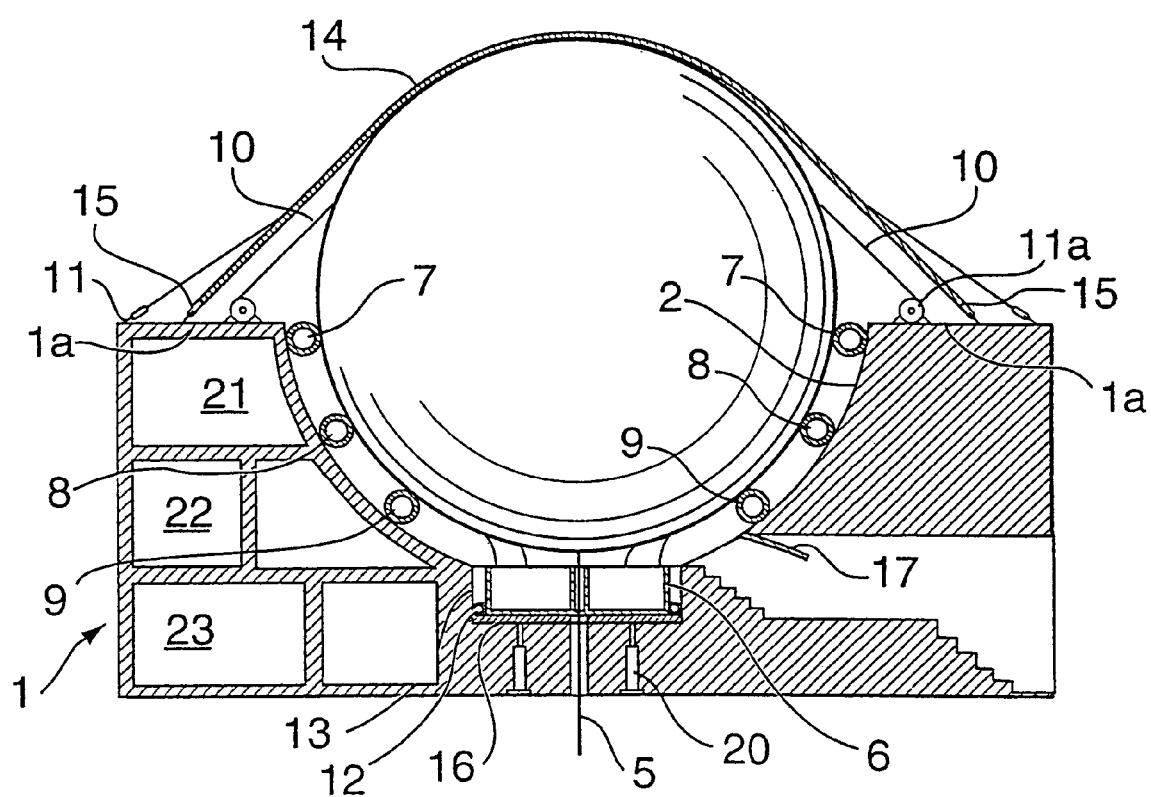
FIG. 2 is a cross-sectional view of the mooring facility with the balloon in the moored position.
Figure 3:
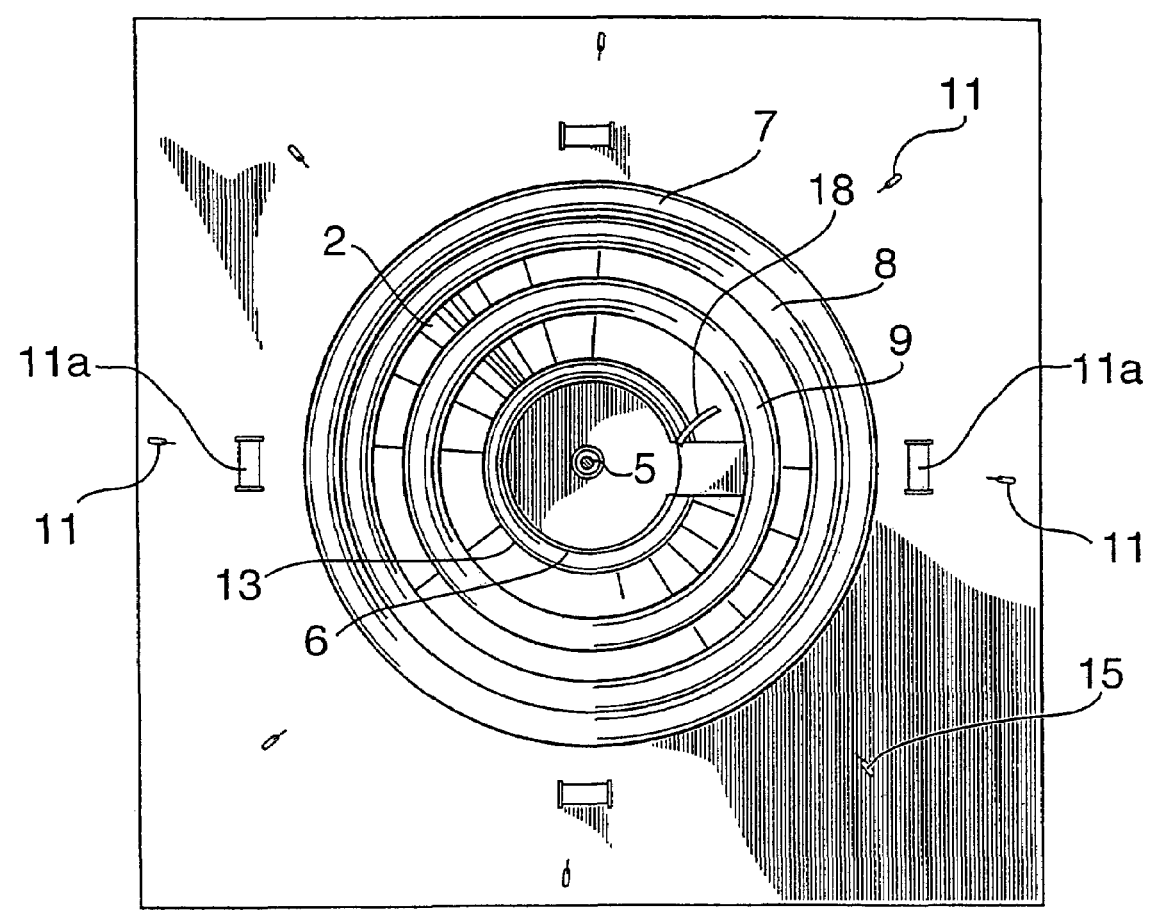
FIG. 3 is a plan view of the mooring facility with the balloon absent.

The nest basin 2 is somewhat larger in diameter than the balloon envelope 4, such that, when the balloon 3 is moored, the lower half of the balloon envelope 4 rests inside the nest basin 2 and is slightly spaced therefrom, with the lower surface of the balloon envelope 4 substantially parallel to, but slightly spaced from, the upper surface of the nest basin 2, as shown in FIG. 2. The spacing of the balloon envelope 4 from the nest basin 2 is maintained by the provision of a plurality of horizontal annular inflatable tubes 7, 8 and 9, which sandwich between the nest basin 2 and the balloon envelope 4 upon and during mooring thereof, to stabilize the balloon 3 in a fixed position, while preventing damage to the balloon 3 or the nest basin 2 by inadvertent contract there between during a mooring operation. Annular tubes 7, 8 and 9, made of strong nylon or similar fabric, may be inflated and pressurized by means of forced air electric fans or other suitable devices.

The balloon is stabilized and immobilized during mooring by the provision of a plurality of mooring lines 10 extending between anchor points 11 and winches 11*a* spaced equidistantly around the roof 1*a* of the nest structure 1 and points on the outer surface of the balloon envelope 4 at a region approximately two-thirds up the side of the envelope. The mooring lines 10 are permanently anchored to the balloon envelope and attach to guy lines extending from the anchor points 11 and winches 11*a* for line-to-line hook up. On disconnection of the mooring lines 10 preparatory to raising the balloon, the lines 10 simply hang freely against the surface of the balloon envelope 4. The balloon is aggressively moored after a flight by securing the lines 10 to the guy lines extending from anchor points 11 utilizing synchronized electrical winches 11*a* also located on the roof 1*a* of the nest structure 1. The roof 1*a* is constructed in suitably reinforced manner to withstand the stresses placed upon it by the installation of heavy equipment, such as the winches 11*a*, and the strain exerted during use thereof.

Suspended below the balloon 3 is a gondola 6 for accommodating an operator and a plurality of fare paying passengers. The gondola may be of any convenient configuration, but is preferably circular or multi-sided, such as hexagonal or octagonal. The gondola has a generally annular configuration, with a central opening to facilitate passage of cable 5. An annular pressurized air filled tube 12 is disposed around the perimeter of the gondola at the bottom thereof to function as a cushion which will allow gentle bumping and rubbing of the gondola against the walls of the nest basin 2 during landing of the balloon. Alternatively, a flat annular cushion can be provided to cover the annular bottom of the gondola 6, to provide a cushioning effect under the gondola as well as at the edges thereof.

At the centre of the bottom of the nest basin 2 is located a nest hole 13, which comprises a recess dimensioned to receive the gondola 6 during landing and to accommodate the gondola during mooring of the balloon 3 resting on a floor 16 of the nest hole 13. On landing, the balloon is winched slowly down to the moored position, with the gondola 6 sliding into the nest hole 13 utilizing the resiliency of the tube 12 to effect a damage-free landing. The horizontal annular tubes 7, 8 and 9 disposed on the surface of the nest basin 2 assure a snug fit of the balloon 3 into the nest basin 2 and protect the balloon envelope 4 from aggressive friction with the basin surface. The top tube 7 is located within the basin at its top edge where the balloon meets the edge of the nest roof 1*a* and provides a snug fit between the basin and the balloon to protect the balloon envelope against outside air flow and aggressive friction. As a consequence of the weather-resistant and windproof fit in the peripheral region between the balloon and the nest at the location of top tube 7, changes in air pressure inside the nest and in the space between the surface of the interior of the nest and the lower surface of the balloon envelope are modulated, so as to avoid sudden pressure surges in windy conditions, thereby maintaining the balloon in a stable and secure mode.

An optional balloon blanket 14, intended to protect the balloon from solar radiation, can be applied over top of the balloon envelope 4 and secured to a plurality of points 15 on the nest roof. Rope ladders (not shown) secured to the top of the balloon may be used to put the blanket in place. Because the roof of the nest place is normally located at the equator of the balloon, the top of the balloon is more accessible by rope ladder.

In operation of the balloon, the balloon is freed from the mooring points and remains connected to the nest basin by the main system winch and cable 5. Using the winch, the balloon and gondola are permitted to rise through the height of the nest hole, so the bottom of the gondola becomes level with the bottom of the nest basin. The nest hole floor 16 is raised to the level of the bottom of the basin—where it will become the launch pad for the gondola. The hole floor 16 is raised and lowered through the use of hydraulic lifts 20 or alternatively by means of electric winches (not shown) located just outside the basin walls. Once in place, the hole floor 16 is firmly secured to the basin wall by use of latches (not shown). A nest basin door 17 is opened to allow passengers entry into the basin and onto the gondola via door 18.

According to a further aspect of the present invention, the portions of the nest structure 1 surrounding the nest basin 2 may be developed into a building structure with rooms 21, 22, 23 for accommodating stores, kiosks, offices or other retail or commercial uses which complement the ballooning activity. In addition, the building may be provided with entry and exit means for passengers to access to the gondola in the nest.

The embodiments of the invention in which an exclusive property or privilege is claimed are defined as follows:

1. A mooring facility for tethered gas balloon, comprising:
   (a) a building structure containing a hemispherical basin capable of receiving a lower portion of a tethered gas balloon, the surface of said basin approximating the surface contour of the lower half of said balloon;
   (b) a recessed portion centrally located at the lower part of said basin for accommodating a gondola suspended beneath said gas balloon in a moored position; and
   (c) mooring means for securing the gas balloon in the moored position in said hemispherical basin with said gondola disposed in said recess.

2. A mooring facility according to claim 1, wherein the hemispherical basin is provided with means to cushion the surface of the balloon when in the moored position.

3. A mooring facility according to claim 2, wherein said cushioning means comprises a plurality of vertically spaced apart horizontal inflated tubes to facilitate a snug fit of the balloon therein.

4. A mooring facility according to claim 3, wherein the upper tube is located proximal to the upper periphery of the hemispherical basin and further being proximal to the equatorial point on a balloon in the moored position, said upper tube providing a weather-resistant and wind-proof seal between the balloon and the hemispherical basin to mitigate pressure surges from impinging on the lower surface of the balloon when moored.

5. A mooring facility according to claims 1, 2, 3 or 4, wherein annular cushioning means is disposed around the periphery of the bottom of the gondola to cushion the gondola upon ingress into the recessed portion and during subsequent mooring therein.

6. A mooring facility according to claim 5, wherein the building is provided with entry and exit means for passengers to access to the gondola in the nest.

7. A mooring facility according to claim 6, wherein at least a portion of the infrastructure surrounding the hemispherical basin constitutes a building with facilities for commercial activities, the hemispherical basin being disposed in the roof of said building.

8. A tethered gas balloon mooring facility, comprising an inflated, lighter than-air balloon suspended by a cable, a mooring facility according to claim 7, and means for raising and lowering the balloon between a moored position in which said balloon is moored in said mooring facility, and an elevated operating position.

9. A mooring facility for a tethered gas balloon, comprising:
- a building structure containing a hemispherical basin capable of receiving a lower portion of a tethered gas balloon, the surface of said basin approximating the surface contour of the lower half of said balloon; said basin further comprising a cushioning means to protect the balloon when in the moored position;
- a recessed portion centrally located at the lower part of said basin for accommodating a gondola suspended beneath said gas balloon in a moored position;
- annular cushioning means disposed around the periphery of the bottom of the gondola to cushion the gondola upon ingress into the recessed portion and during subsequent mooring therin; and
- mooring means for securing the gas balloon in the moored position in said hemispherical basin with said gondola disposed in said recess.

10. A mooring facility according to claim 9, wherein said cushioning means comprises a plurality of spaced apart horizontal annular inflated tubes to facilitate a snug fit of the balloon therein.

11. A mooring facility according to claim 10, wherein the upper tube is located proximal to the upper periphery of the hemispherical basin and further being proximal to the equatorial point on a balloon in the moored position, a weather-resistant and wind-proof seal between the balloon and the hemispherical basin to mitigate pressure surges from impinging on the lower surface of the balloon when moored.

* * * * *